United States Patent [19]
Morgan

[11] 4,136,369
[45] Jan. 23, 1979

[54] DISC RECORDER WITH LEAD SCREW DRIVE

[75] Inventor: Samuel A. Morgan, Ann Arbor, Mich.

[73] Assignee: Sycor, Inc., Ann Arbor, Mich.

[21] Appl. No.: 655,970

[22] Filed: Feb. 6, 1976

Related U.S. Application Data

[60] Continuation of Ser. No. 531,246, Dec. 1, 1974, abandoned, which is a division of Ser. No. 418,299, Nov. 23, 1973, Pat. No. 3,913,137.

[51] Int. Cl.² .......................... G11B 21/08; G11B 5/55
[52] U.S. Cl. .................................................... 360/106
[58] Field of Search .................. 360/106, 78, 107, 86; 74/89.15, 424.8; 64/11 B

[56] References Cited

U.S. PATENT DOCUMENTS

| | | | |
|---|---|---|---|
| 3,566,381 | 2/1971 | Buslik et al. | 360/106 |
| 3,678,481 | 7/1972 | Dalziel | 360/106 |
| 3,770,905 | 11/1973 | Sperry | 360/106 |
| 3,814,441 | 6/1974 | Craggs | 360/106 |
| 3,874,245 | 4/1974 | Kral et al. | 74/424.8 R |
| 3,879,757 | 4/1975 | Elliott et al. | 360/99 |
| 3,990,111 | 11/1976 | Elliott | 360/99 |

Primary Examiner—Robert S. Tupper
Attorney, Agent, or Firm—Price, Heneveld, Huizenga & Cooper

[57] ABSTRACT

A data recorder/reproducer device for disc media, particularly limply flexible magnetic disc media, having a pair of door-like structures mounted on opposite sides of a supportive frame, each such structure defining a narrow slit-space for receiving a recording disc and its envelope and mounting the same for recording, with a drive shaft supported on the frame centrally thereof, having a drive hub at either end aligned with the central opening in the recording disc, such that both discs are driven by the same drive train. The device has at least two recording heads, one for each disc, and the heads are articulated for selective control of movement toward or away from their particular disc, into or out of transducing relation thereto; also, the heads are mounted for translational movement across the face of their respective discs, generally radially thereof. In a preferred embodiment, there are four such heads, one for each side of each disc, so that all four sides may be recorded in a selective manner, each such head being movably articulated.

7 Claims, 7 Drawing Figures

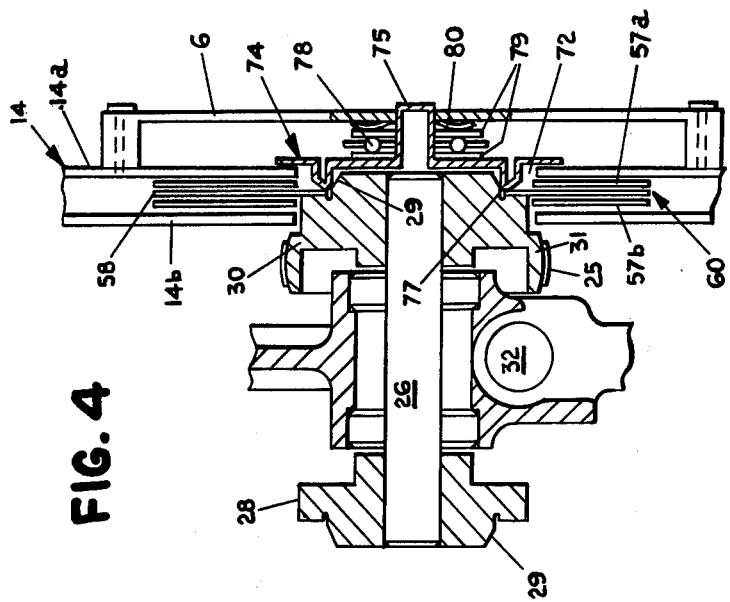
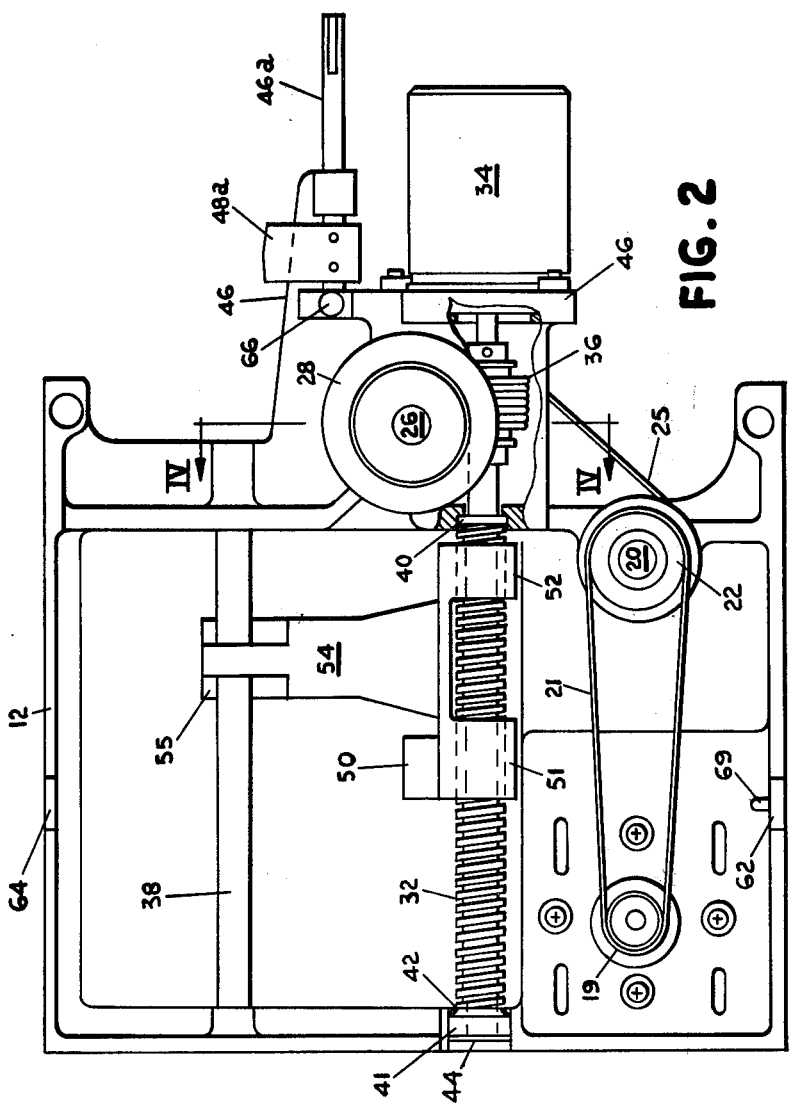

DISC RECORDER WITH LEAD SCREW DRIVE

CROSS REFERENCE TO RELATED APPLICATION

This is a continuation application of copending application Ser. No. 531,246, filed Dec. 1, 1974 and now abandoned, which was a divisional application of parent application Ser. No. 418,299, filed Nov. 23, 1973, now U.S. Pat. No. 3,913,137.

BACKGROUND OF THE INVENTION

Quantity long-term data storage has long been accomplished on such media as magnetic tape and rigid magnetic discs, as well as punched paper cards and tape; however, the magnetic disc, mainly used heretofore have largely been of the rigid type, typically mounted in a semi-permanent manner in a spaced parallel array within a protective enclosure, and involving numerous refinements and precautionary refinements, including for example non-contacting "flying" magnetic heads and the like. Nonetheless, such discs have certain advantages compared to other media and even compared to magnetic tape, including extremely short access times and other such features. However, until recently such advantages have been obtained only at relatively high expense, and with other inconvenience such as the requirement of meticulous and careful handling, etc.

More recently, the advent, at least in a practical sense, of flexible disc recording technologies have shown the advantages of the inexpensive limp or "floppy" flexible discs, typically made by coating the opposite sides of a thin highly flexible sheet of polymeric or other plastic film with magnetic oxide, with the coated disc being only on the order of 3 to 4 mils thick. This limply flexible disc is then permanently enclosed within a close-fitting sleeve-like protective outer envelope, in which it may be rotated while the envelope is held in position. The envelope has an enlarged central opening for access to the center of the disc, and also has a radial slot opening, by which a magnetic head may access the face of the disc while the same is rotated. For example, the disc structure may be substantially shown in U.S. Pat. No. 3,668,658, and one form of recorder/reproducer device for such a device is shown in U.S. Pat. No. 3,678,481.

Previously-known recorders using flexible discs of the type just noted have not been sufficiently developed so as to have all, or even most of, the exceptionally great operational flexibility made possible by the flexible disc recording media; for example, such recorders have been limited to the use of a single disc and would only operate to record on one side of the disc, despite the presence on both sides of suitable magnetizable media, recording on both sides being possible only by physically withdrawing and inverting the disc. Furthermore, loading of the discs to the recording heads has been cumbersome and at times ineffective and even defective, involving the use of a variety of different types and arrangements of pressure pads and other such elements.

SUMMARY OF THE INVENTION

The present invention provides a new version of recorder/reproducer apparatus for flexible disc recording, having greatly increased operational flexibility, greatly increased recording capacity, and considerably different structural characteristics from recorders used heretofore.

The device of the invention is constructed to receive a pair of the flexible disc elements, and to record on either or both sides of either of both such discs, as may be required. Thus, the device includes at least two magnetic heads, and means mounting the same for articulated movement toward and away from their respective recording discs, as well as means mounting the heads for translational movement across the face of the discs while the same are rotated. Preferably, the device includes a common drive by which both such recording discs may be rotatably driven, as well as a common translational drive for the magnetic heads, such that all of the same are simultaneously moved across the face of their respective discs.

The foregoing major attributes of the invention, together with the advantages thereof, as well as other important attributes and advantages, will become more apparent following consideration of the ensuing specification and the accompanying drawings illustrating a preferred embodiment thereof.

BRIEF DESCRIPTION OF THE DRAWINGS

FIG. 2 is a side elevation similar to FIG. 1, but with the disc-receiver removed to show the frame;

FIG. 4 is a fragmentary sectional end elevation taken through the plane IV—IV of FIG. 2;

DESCRIPTION OF A PREFERRED EMBODIMENT

Figure 3:
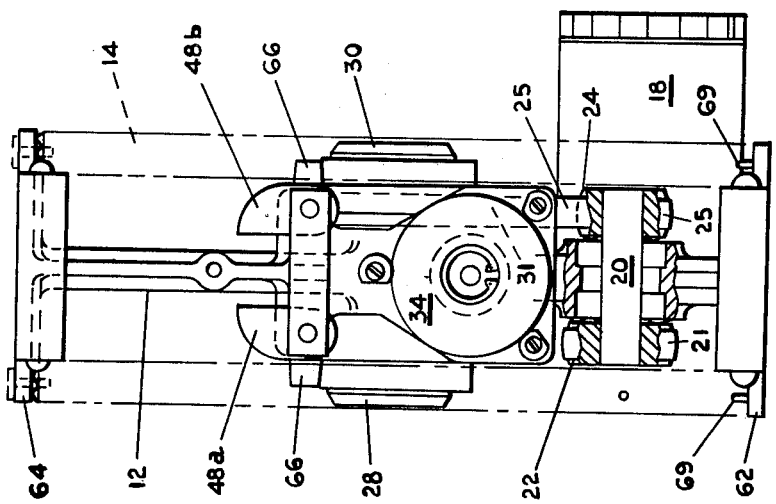
FIG. 3 is an end elevation of the structure seen in FIG. 2, showing in phantom the position of the disc-receivers.
Figure 1:
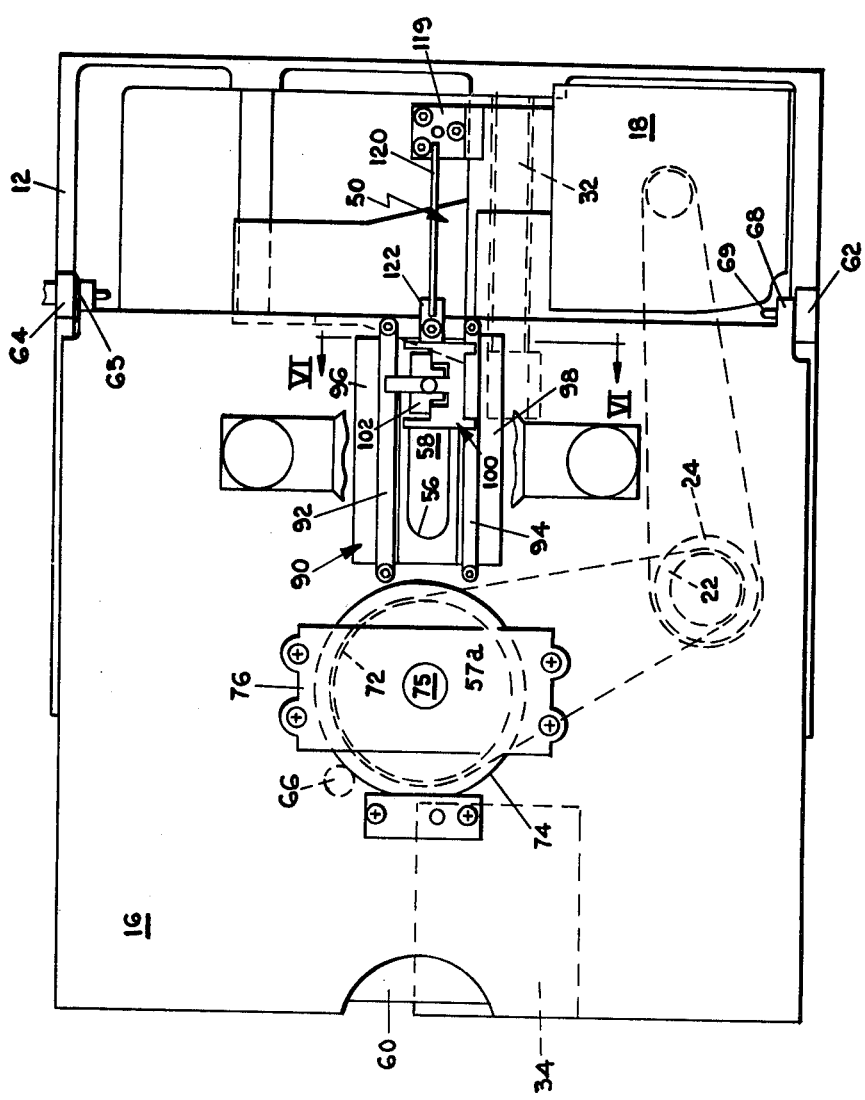
FIG. 1 is the side elevational view of the device.
Figure 5:
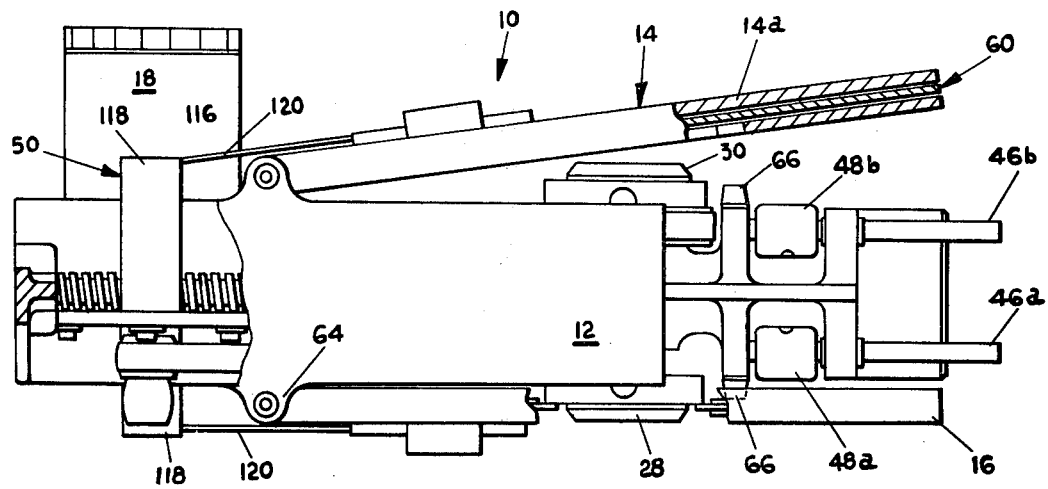
FIG. 5 is an overhead plan view of the device of FIG. 1, showing one disc-receiver open for receiving a disc.

The recorder 10 of the invention basically includes an upright central frame 12 which carries a pair of disc-receivers 14 and 16 which are pivotally hinged on either side of the frame, similar to doors (FIGS. 1 and 5). The frame 12 thus defines what may be referred to as the central plane area of the recorder device, i.e., the generally planar central area sandwiched between the disc-receivers 14 and 16, which are generally parallel when in their closed positions. Also, the frame 12 mounts many of the operative components of the device, including a drive motor 18 (FIGS. 3 and 5), a jack shaft 20 having hubs or pulleys 22, 24 on either side of the frame, a drive shaft 26 having drive hubs 28, 30 at either end thereof, and an elongated lead screw or worm 32, together with a stepper motor 34 which drives the worm, through a bellows coupling 36 which provides a universal drive coupling which will compensate for any alignment tolerances. Also, the frame 12 mounts a straight, smooth guide rod 38 (FIG. 2) above and parallel to worm 32.

The worm 32 is securely supported at each end, being mounted in bosses machined in either side of the frame 12, in which bearings 40, 41 are seated (FIG. 2). Bearing 40 seats against an internal shoulder inside its boss, and the worm is spring-loaded toward the latter (i.e., toward the right as seen in FIG. 2) at all times by a wave-type spring thrust washer 42 disposed between the end portion of the worm and bearing 41, the latter being held firmly in position by a split retaining ring 44. Thus, the worm stays accurately in position at all times, and is no way dependent for positioning upon, or loaded by, its connection to the stepper motor 34. The latter mounts upon a machined pad 46 formed as an integral part of frame 12, with the coupling 36 thus floating between the rigidly mounted motor and worm. Stepper motor 34 may be a conventionally-available member, for example a fifteen-degree incremental stepper.

A traveling motion translator or follower device 50 (FIGS. 1 and 2) is threaded on worm 32 to be moved thereby, upon rotation of the worm by the stepper motor 34. The translator or follower 50 has a pair of spaced, internally threaded, worm-receiving bosses 51, 52 which engage the worm threads, and these bosses are each preferably long enough to engage several turns of the worm thread. The translator is preferably of plastic such as nylon or Delrin and thus has a degree of resiliency; consequently, by engaging several turns of the worm thread, any tolerance variations in the worm thread will be averaged out, so that movement of the translator or follower along the worm will remain accurately proportional to rotation thereof at all points. The follower has an upstanding guide portion 54 with mutually-spaced finger-like projections 55 at the top, which slideably engage opposite sides of the guide rod 38, to prevent rotation of the follower with the worm and thereby cause longitudinal translation of the follower when the worm is rotated. Tracking accuracy is facilitated by accurate translational movement of the follower along the worm, as well as by positional stability of the worm. It is for this purpose that the carrier bosses 51, 52 have a wide stance upon the worm, with the total end-to-end separation of the bosses preferably being greater than the distance the heads must traverse along the disc, as reflected by the free portion of the worm unoccupied by any part of the follower. Thus, the worm is on the order of twice as long as the head travel must be, and the height or distance of the guide 38 above the worm is on the order of the same distance spanned by the follower bosses, i.e., approximately the same magnitude, or exceeding, the required travel of the heads.

The disc-receivers 14, 16 each comprise in effect a pair of generally rigid plate-like portions 14a, 14b, 16a, 16b (FIG. 5), fixedly secured together to define a narrow, slot-like space therebetween for receiving a flexible disc assembly 60 or other such recording media. That is, as mentioned above, the apparatus of the invention is particularly useful with a flexible disc assembly 60 of the type described previously, but it is to be noted that in the broader aspects of the invention, the device is certainly effectively usable with other forms of disc recording media. Also, it should be understood that the term "recorder/reproducer" is used herein to mean a device which will provide either or both such functions.

In the present embodiment the disc assembly 60 includes a flexible recording disc 58 within a narrow envelope having sides 57a, 57b (FIGS. 4 and 6) which are typically square in shape, having corners which closely fit within interior corners of the receivers, to provide for initial positioning of the recording disc itself and to preclude rotation of the envelope upon rotation of the disc during recording or reproducing operation.

The two receivers 14 and 16 are each pivotally mounted upon the frame 12 in a manner providing very accurate referencing of the receivers with respect to other portions of the device, e.g., the drive hubs 28 and 30. For this purpose, the frame 12 has a pair of pivot pin bosses 62 and 64 (FIGS. 1, 2 and 3) disposed at the top and bottom thereof, as well as outwardly-projecting alignment posts 66, the latter being located as close as practical to the axis of drive shaft 26. Lower pivot pin boss 62 has an accurately-located upper surface which provides a pivot support for the lower corner of the disc receivers, by the direct contact therewith of a lower pivot boss 68 (FIG. 1) on the receivers, there being an appropriate upstanding pivot pin 69 from each of the bosses 62 for engaging an aperture in the receiver boss 68. The upper pivot boss 64 on the frame does not accurately guide or position the receivers, however, there being instead a nominal clearance therebetween, with a wave-washer 65 (FIG. 1) to provide downward spring-biasing of the upper rear corner of the receivers, to maintain referencing of pivot bosses 62 and 68 by close contact thereof. To complete this referencing arrangement, the alignment posts 66 are accurately positioned and relative to the lower bosses 68, and engage in appropriate apertures in the inner member (such as 14b) of each of the receivers, such aperture being very accurately sized with respect to the diameter of the alignment posts, which are slightly tapered to provide a self-centering function. With this arrangement, the receivers 14, 16 are mounted pivotally on the frame, in the manner of doors, the position of which is not critically controlled or referenced excepting the fully-closed position, where this becomes an important factor in successful recording. That is, the receivers are preferably spring-loaded toward a closed position, as by a tension spring 70 extending between the inside of the receiver and the frame (FIG. 5). When swung to their closed position, the door-like receivers are very accurately positioned by the contacting surfaces of bosses 62 and 68, together with the alignment posts 66. In this manner, a disc assembly 60 within the receivers will be accurately positioned relative to the drive hubs 28, 30, so that very little additional centering of the recording disc upon the hub is necessary to provide for proper rotary driving of the disc by the hub.

As illustrated in the various figures, the drive motor 18 has a drive hub or pulley 19 on its outboard shaft, and a flexible drive belt 21 (which is preferably of a rubberized fabric) couples hub 19 to hub 22 on jack shaft 20. On the opposite side of the latter, hub 24 is coupled by a similar drive belt 25 to an interior hub portion 31 (FIGS. 3 and 4) of the disc-driving hub 30. Consequently, driving motion of the motor rotates jack shaft 20 through belt 21, and the jack shaft in turn rotates drive shaft 26, through belt 25, thereby rotating both of the disc-driving hubs 28 and 30.

Each of the opposite side plates such as 14a, 14b of the disc-receivers has a pair of sizeable lateral openings therethrough, a first such opening 70 (FIG. 1) being circular in shape and providing access to the center of the disc for clamping the same against the drive hubs 28 and 30, and the second such opening 90 being generally rectangular in shape and providing access to the disc through an elongated opening 56 in one side 57a of the envelope which encloses the flexible recording disc 58 itself, the disc and the envelope constituting the aforementioned disc assembly 60.

The manner in which the flexible disc 58 is clamped to the drive hub is best seen in FIG. 4 and comprises, basically, a stiffly flexible saucer-shaped idler hub or disc clamp 74 having an outwardly-projecting shank 75 which is rotatably received in an opening provided in a generally C-shaped mounting bracket 76 attached to the outer plate 14a of the disc-receiver. The idler hub 74 has projecting annular ridged formation 77 which protrudes through the opening 74 in the side of the disc receiver, and when the latter is in its fully closed position, this annular ridge tightly clamps the flexible disc 58 against the adjacent drive hub 30 or 28. The mounting shank 75 of idler hub 74 carries a self-contained ball bearing 78 positioned between a pair of flat washers 79 with a wave-type spring washer 80 which forces the clamping hub toward the drive drum and away from the mounting bracket 76, the arrangement being such that when the receiver door is fully closed and the disc is clamped against the drive hub, the clamping hub is forced laterally outward at least slightly away from the receiver, against the pressure of spring washer 80, thereby creating a small clearance between the clamping hub and the side 14a of the receiver while ensuring a forceful clamping of the disc to the drive hub.

As may be seen, the drive drums 28, 30 have a conically angled portion 29 (FIG. 4) which helps center and guide the flexible disc 58 into its position for clamping by idler hub 74. That is, the interior configuration of the disc-receivers should position the disc assembly 60 with sufficient accuracy so that the center of the flexible disc 58 will at least generally be aligned over the conically-beveled face 29 of the drive drum, such that when the disc-receivers are fully closed, the protruding annular ridge 77 on the clamping hub will push the disc across the sloping, tapered face 29 of the drive hub, thereby centering and seating the flexible disc in the desired position. Of course, spring 70 or other such device which biases the disc-receiver toward a closed position will help maintain the clamping pressure of the disc against the drive hub. To provide for convenient opening of the disc-receivers, the frame rotatably mounts a pair of shafts 46a, 46b (FIGS. 2 and 3), on which are mounted opening cams 48a, 48b, such that rotation of the control shafts forces the cam involved against the adjacent disc-receiver, opening the latter against the tension of spring 70.

Figure 6:
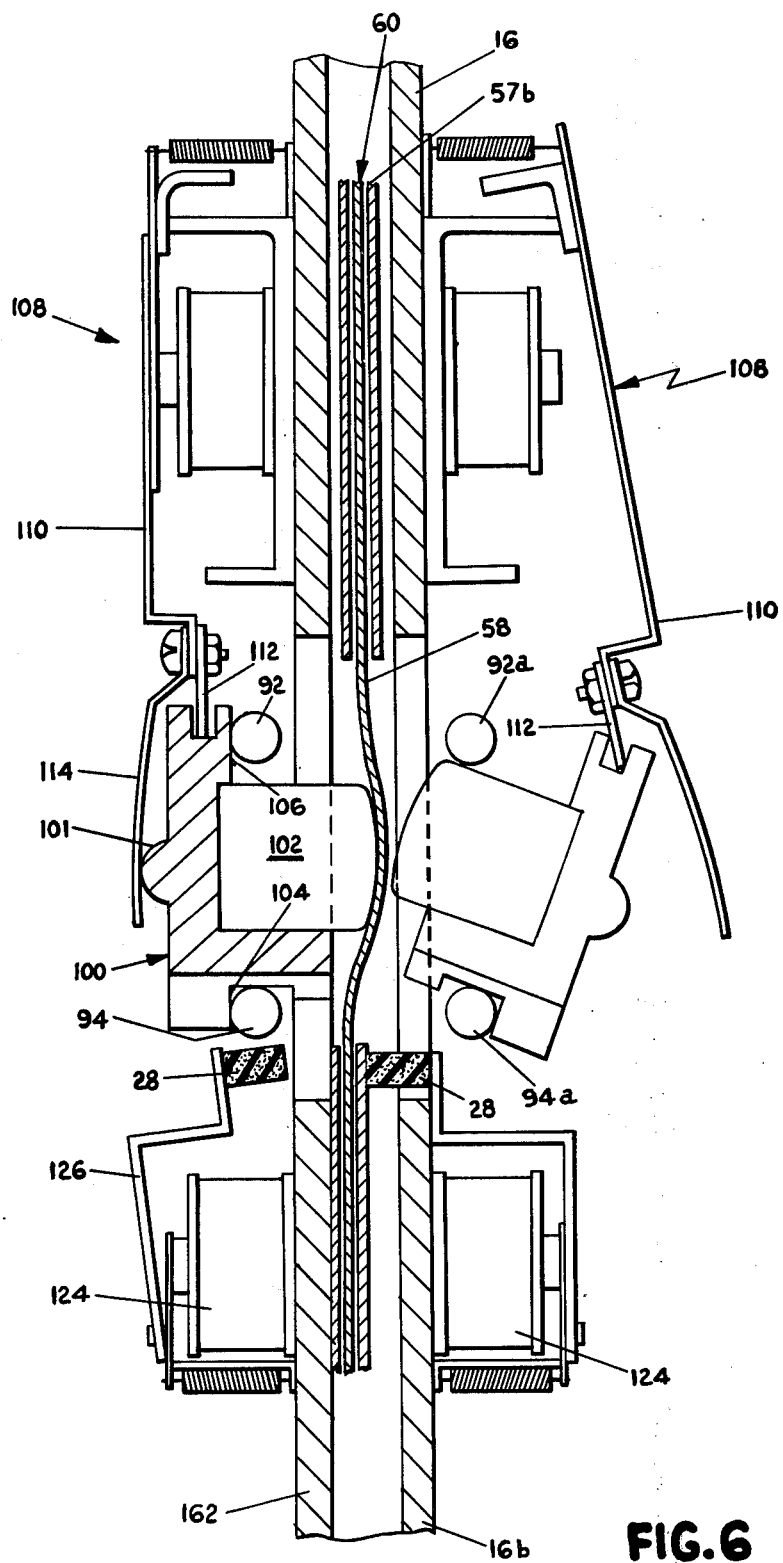
FIG. 6 is an enlarged, fragmentary sectional elevation taken through the plane VI—VI of FIG. 1, showing a magnetic head engaging a disc.

The rectangular opening 90 in each of the disc-receivers, mentioned previously, has a pair of spaced, parallel guide rods 92, 94 (FIG. 1) mounted across it, in a manner which provides three spaced, rectangular openings 96, 97 and 98 above, between and below the guide rods. More particularly, the rectangular opening 90 in the disc receivers extends through both side portions 16a, 16b thereof, (FIG. 6), and guide rods 92, 94 have counterparts 92a, 94a mounted on the inside plate portion 16b (or 14b) of each disc-receiver. The guide rods provide accurate referencing relative to the disc-receivers on which they are mounted and, furthermore, each guide rod slidably supports a magnetic head-carrier block 100, upon which a magnetic head 102 is rigidly supported, as by screws extending upwardly into the head from the underside of the head carrier. Each of the head carriers 100 has a rectangular guideway in its underside which fits over the lower guide 94, and also includes a flat vertical surface 104 which bears flush against the side of guide rod 94. Similarly, the top portion of the carrier block 100 has a flat vertical guide surface 106 which bears flush against the side of the upper guide rod 92. These surfaces provide reference positions and are very important to successful recording and reproducing operation, inasmuch as they establish the depth of penetration of the curved face of head 102 into the plane of flexible disc 58, and it is now generally known that the parameters of such penetration, (i.e., depth and angle of head) are very important factors in obtaining suitable recording on a flexible disc. In this respect, it should here be noted that, as illustrated in FIG. 6, although the face of the recording head protrudes into the disc, the particular extent and nature of such protrusion and penetration is not a focal point of this invention; thus, terms used herein such as "penetration" or "proximate engagement" of the head to the disc are not used in a critical sense and are to be construed very generally. The same is basically true of the expression "narrow" or "slot-like" used in connection with the width of the space inside the disc-receivers.

As so positioned upon the guide rods 92, 94, head carrier 100 is thus rockable upon the lower guide bar 94, toward and away from (i.e., "angularly" with respect to) the disc-receiver and the disc positioned within the latter; at the same time, the head carrier is slidable along the guide rods, both when tilted toward and away from the recording disc. The tilting or rocking movement of the head carrier is determined by operation of a solenoid 108 mounted above the latter and responsive to energization by moving a control arm 110 inwardly and outwardly with respect to the disc-receiver. Attached to the lower extremity of control arm 110 (or integral therewith) is a first actuator portion 112 comprising an elongated stiffly resilient flaplike element loosely disposed within a rectangular notch or guideway in the top of the head carrier block 100. Also attached to the lower end of control arm 110 is a second actuator 114, comprising a resiliently flexible sheet metal or like spring member which bears against a round protrusion 101 on the outer or rear side of the head carrier. Thus, when the solenoid pulls in upon being energized, the more rigid actuator 112 will operate to move the carrier block into generally vertical position near contact with both guide rods, but the resilient actuator 114 will push directly against protrusion 101 and spring-load the carrier block against both upper and lower guide bars, thereby bringing the head 102 into referenced transducing position. Conversely, when the solenoid is de-energized, outward excursion of the control arm 110 will move the spring actuator 114 away from the back of carrier block 100 and, at the same time, move the first actuator within the slot at the top of the carrier block and against the upper portion thereof, tipping the carrier block back into the position shown at the right in FIG. 6, in which the head is fully out of transducing relation with the disc.

As stated above, each of the disc-receivers 14, 16 may carry a pair of transducing heads, each mounted in a separate carrier block 100 supported on its own guide rods, with separate actuating solenoids for each. Thus, each disc may be recorded on either side, to give selectable four-way recording or reproducing operation. Of course, fewer numbers of recording heads may also be used, for example, only one on each disc-receiver, in which the discs may be physically reversed to provide for opposite-side recording, while realizing certain economies by the elimination of two complete recording heads and all of the associated elements and read-write electronics.

In any event, the head carriers and the transducing heads mounted thereon are subjected to sliding movement upon guide rods 92 and 94, thereby imparting translational or traversing movement to the transducing heads radially (or generally so) across the face of the recording discs, i.e., in either lateral direction within the elongated radial slot 56 in the disc envelope. This translational movement is obtained by coupling the head carriers 100 to the translator or follower 50 which is threadably mounted on the lead screw or worm 32 as described above.

That is, the follower 50 has a transverse arm 116 (FIGS. 5 and 7) having an upstanding leg portion 118 at either end, disposed generally in alignment with each of the disc-receivers. To each opposite side of these upstanding leg portions is secured one end of a stiffly flexible head-positioning arm 120, which may be of stainless steel music wire or the like, such member being rigidly secured to a thin metal or like plate 119 which in turn is attached by screws or the like to the ends 118 of the transverse arm 116. The opposite ends of the head arms 120 are attached to a laterally-extending tab portion 122 forming a part of the head carrier 100 (FIG. 1).

In this manner, the head carrier, and thus the recording head itself, is positioned on the guide bars with requisite accuracy relative to the motion translator or follower 50, and thus to the worm itself, since the length of the head arm 120 serves as an indexing tool. Of course, the rigidity of the head arms allows them to push or pull the attached head-carriers across their respective discs. At the same time, the torsional flexibility of the head arms allows the head carriers and their respective recording heads to be free for the limited movement required in tilting or rocking the same upon the guide bars, into and out of transducing position, while, at the same time, freely tracking across the face of the disc as a result of movement by the translator 50 in response to stepped rotation of the lead screw or worm 32. Further, as may be seen in FIG. 5, upon opening of the disc-receiver doors, the flexibility of the head arms 120 allows the latter to bow elastically the requisite extent. As for the actual extent to which the disc-receiver doors may be opened, it should be stated that positive limiting should be provided, and typically will be by virtue of a confining enclosure or case (not specifically shown) in which the recorder device will customarily be permanently housed, such case having an end opening providing access to the open ends of the disc receivers for insertion and withdrawal of recording discs. Of course, other forms of positive stops could also be provided in numerous ways, as for example, by a tether cable or the like mounted with spring 70, for limiting the extent to which the latter may be stretched.

Figure 7:
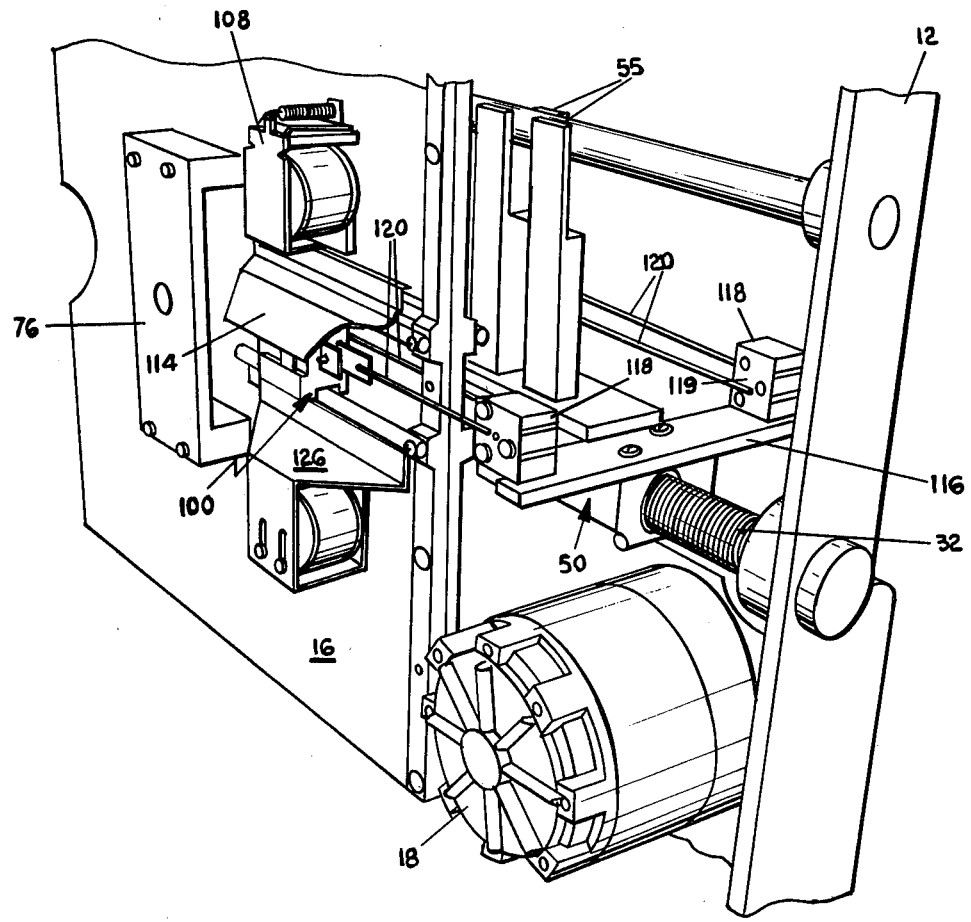
FIG. 7 is a fragmentary side perspective view of the apparatus of FIG. 1, showing other details thereof.

In order to assure proper transducing proximity of the transducing head with the flexible disc 58, it is desirable to utilize a pressure pad to force the disc toward the transducing head. It is known in the art to use various forms of resilient pad for this purpose, typically disposed directly opposite from the transducing head, to in effect squeeze the recording media therebetween. A different approach is preferably used in the present invention, as illustrated in FIGS. 6 and 7. Basically, a second solenoid 124 is mounted below the lower guide bar 94, with an upstanding control arm 126 which carries a pressure pad 128 at the top thereof, made of elastomeric foam or the like. Pressure pad 128 is generally coextensive with the lower rectangular opening 98 beneath guide bar 94, but is sufficiently smaller than the latter to fit through it when control arm 128 is moved accordingly, upon energization of solenoid 124. Thus, when the head carrier 100 on one side of a recording disc is moved into transducing position, the pressure pad 128 on the opposite side of that disc is moved into position by actuation of its controlling solenoid. When so actuated, the pressure pad moves inside the disc-receiver and against the flexible disc envelope 57b, squeezing the entire disc assembly 60 against the opposite interior face of disc-receiver plate 16a. In this position, the flexible disc 58 actually forms a traveling, dimple-like deformation around the curving face of the transducer head, as illustrated, it being understood that the direction of motion of the disc is from the pressure pad toward the transducing head. In this manner, the required relationship is established between the flexible disc and the face of the recording head for proper transducing operation, even though there is no backup pressure pad disposed directly behind, or in alignment with, the face of the transducing head.

It is entirely conceivable that upon examining the foregoing disclosure, those skilled in the art may device embodiments of the concept involved which differ somewhat from the embodiment shown and described herein, or may make various changes in structural details to the present embodiment. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege are claimed are described as follows.

1. In a data recorder/reproducer device, of the type using a disc-form recording media and having a transducer and a lead screw and follower apparatus for moving the transducer across the recording disc, the improvement wherein said device has a rigid main support frame mounting component parts of the device, said parts including said lead screw and a motor-driven hub for engaging and rotating said disc, said frame having a pair of mutually spaced and oppositely-aligned means for supporting said lead screw in position at widely-spaced points relative to the length of the lead screw, said points spaced apart sufficiently to support the lead screw near its opposite end extremities; bearing means for said lead screw, disposed at at least a first one of said screw-supporting frame points, and means at said first frame point for holding said bearing means in place against lateral movement in at least one direction; said bearing means including a portion engaging said lead screw and holding it from shifting longitudinally in at least said one direction; means for continuously resiliently loading said screw endwise along a major portion of length axially from the other of said screw-supporting frame points and against said bearing means to resiliently hold the lead screw from shifting longitudinally away from said bearing means; and drive motor means coupled to said lead screw to rotate the latter.

2. The improvement of claim 1, wherein said means for resiliently loading said screw includes a resilient force member acting against an end portion of said screw.

3. The improvement of claim 1, including a shoulder at said first one of said shaft supporting frame points for contacting said bearing means to position it, said resilient loading means acting to force at least portions of said bearing means toward said shoulder.

4. The improvement of claim 3, wherein said lead screw has a lateral shoulder for thrust contact with said bearing means, and said means for resiliently loading said screw includes a resilient force member biasing said screw shoulder axially against said bearing means.

5. The improvement of claim 1, wherein said frame defines a rigid mounting pad for said motor, and including a rotary drive coupling connecting the motor drive shaft to said lead screw, said coupling comprising a flexible bellows element connected between said drive shaft and said lead screw to transmit rotational drive motion from the drive shaft to the lead screw.

6. In a data recorder/reproducer device, of the type using disc-form recording media and having a transducer and lead screw and follower apparatus for moving the transducer across the recording disc, the improvement wherein said device has a rigid supportive frame with a pair of mutually spaced portions defining oppositely-aligned shaft bosses, means journaling said lead screw in said bosses at widely-spaced points relative to the length of the lead screw; indexing means at one point acting against said lead screw to prevent it from shifting axially in one direction, means for resiliently biasing said screw from one end toward the other end thereof and against said indexing means to inhibit axial shifting of the screw in the other axial direction, and drive motor means coupled to said screw to rotate the latter, said means including a motor and a mount therefore supporting the motor independently of said screw and without structural loading of either such element by the other.

7. The improvement of claim 6, including a generally rectilinear, guide surface disposed generally coplanar with said lead screw and a guide member rigidly coupled to said follower and extending transversely away from the latter toward and into sliding contact with said guide surface, said guide surface being located a distance from said lead screw on the order of the distance between said follower bosses.

* * * * *

UNITED STATES PATENT AND TRADEMARK OFFICE
CERTIFICATE OF CORRECTION

PATENT NO. : 4,136,369
DATED : January 23, 1979
INVENTOR(S) : Samuel A. Morgan

It is certified that error appears in the above-identified patent and that said Letters Patent are hereby corrected as shown below:

Column 8, line 49:

after "said bearing means" delete --- including a portion ---.

*Signed and Sealed this*

*Sixth* Day of *November 1979*

[SEAL]

*Attest:*

RUTH C. MASON
*Attesting Officer*

LUTRELLE F. PARKER
*Acting Commissioner of Patents and Trademarks*